United States Patent
Thermond et al.

(10) Patent No.: US 7,394,796 B2
(45) Date of Patent: Jul. 1, 2008

(54) WIRELESS ACCESS POINT SERVICE COVERAGE AREA MANAGEMENT

(75) Inventors: Jeffrey L. Thermond, Saratoga, CA (US); Richard G. Martin, Morgan Hill, CA (US); Jeff Abramowitz, Menlo Park, CA (US); Stephen Palm, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1424 days.

(21) Appl. No.: 10/357,795

(22) Filed: Feb. 4, 2003

(65) Prior Publication Data

US 2004/0017793 A1    Jan. 29, 2004

Related U.S. Application Data

(60) Provisional application No. 60/398,744, filed on Jul. 26, 2002.

(51) Int. Cl.
*H04Q 7/24* (2006.01)

(52) U.S. Cl. .................. 370/338; 370/328; 370/332; 370/339; 370/337; 709/203; 709/230; 455/434; 455/63.4; 455/138; 455/562.1; 455/575.7

(58) Field of Classification Search .............. 370/338, 370/339, 328, 337, 332, 349, 389; 709/230, 709/203; 455/426.1, 562.1, 556.2, 138
See application file for complete search history.

(56) References Cited

U.S. PATENT DOCUMENTS

| | | | |
|---|---|---|---|
| 6,486,832 B1 * | 11/2002 | Abramov et al. | 343/700 MS |
| 6,611,231 B2 * | 8/2003 | Crilly et al. | 342/378 |
| 6,816,735 B1 * | 11/2004 | Rayburn et al. | 455/456.4 |
| 6,933,887 B2 * | 8/2005 | Regnier et al. | 342/372 |
| 7,006,040 B2 * | 2/2006 | Henderson et al. | 342/372 |
| 7,009,956 B2 * | 3/2006 | Heinonen et al. | 370/338 |
| 7,103,313 B2 * | 9/2006 | Heinonen et al. | 455/41.2 |
| 7,120,131 B2 * | 10/2006 | Seppala et al. | 370/310 |
| 7,162,273 B1 * | 1/2007 | Abramov et al. | 455/562.1 |
| 7,248,570 B2 * | 7/2007 | Bahl et al. | 370/329 |

* cited by examiner

*Primary Examiner*—Marceau Milord
(74) *Attorney, Agent, or Firm*—Garlick Harrison & Markison; Bruce E. Garlick; Holly L. Rudnick

(57) ABSTRACT

A Wireless Local Area Network (WLAN) infrastructure includes a wired backbone network, an air controller, and a plurality of wireless access points (WAPs). Each WAP includes a processor, a wired backbone interface, a first radio, a directional antenna, a second radio, and an antenna. The first radio and directional antenna service wireless terminals. The second radio and the antenna collect non-participatory WAP data. The first radio and directional antenna optionally collect participatory WAP data. Based upon the non-participatory WAP data (and optionally the participatory WAP data), the processor creates WAP operational reports and provides the WAPs operational reports to the air controller. The air controller creates directions based thereon and directs one or more of the WAPs to alter the gain pattern(s) of the directional antenna(s), alter the transmit power(s) of the first radio(s), and/or to alter the channel usage of the first radio(s). In another embodiment, the first radio collects non-participatory WAP data when not servicing communications with wireless units.

41 Claims, 12 Drawing Sheets

WIRELESS ACCESS POINT SERVICE COVERAGE AREA MANAGEMENT

CROSS REFERENCE TO RELATED APPLICATION

This application claims priority to U.S. Provisional Patent Application Ser. No. 60/398,744, filed Jul. 26, 2002, which is incorporated herein by reference in its entirety for all purposes.

FIELD OF THE INVENTION

This invention relates generally to wireless local area networks; and more particularly to the management of wireless access points within such wireless local area networks.

BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with each other on a global basis. Wired Local Area Networks (LANs), e.g., Ethernets, are also quite common and support communications between networked computers and other devices within a serviced area. LANs also often link serviced devices to Wide Area Networks and the Internet. Each of these networks is generally considered a "wired" network, even though some of these networks, e.g., the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11(a) networks, IEEE 802.11(b) networks, and IEEE 802.11(g) networks, referred to jointly as "IEEE 802.11 networks." In a typical IEEE 802.11 network, a wired backbone network couples to a plurality of Wireless Access Points (WAPs), each of which supports wireless communications with computers and other wireless terminals that include compatible wireless interfaces within a serviced area. The wired backbone network couples the WAPs of the IEEE 802.11 network to other networks, both wired and wireless, and allows serviced wireless terminals to communicate with devices external to the IEEE 802.11 network.

WLANs provide significant advantages when servicing portable devices such as portable computers, portable data terminals, and other devices that are not typically stationary and able to access a wired LAN connection. However, WLANs provide relatively low data rate service as compared to wired LANs, e.g., IEEE 802.3 networks. Currently deployed wired networks provide up to one Gigabit/second bandwidth and relatively soon, wired networks will provide up to 10 Gigabit/second bandwidths. However, because of their advantages in servicing portable devices, WLANs are often deployed so that they support wireless communications in a service area that overlays with the service area of a wired network. In such installations, devices that are primarily stationary, e.g., desktop computers, couple to the wired LAN while devices that are primarily mobile, e.g., laptop computers, couple to the WLAN. The laptop computer, however, may also have a wired LAN connection that it uses when docked to obtain relatively higher bandwidth service.

When a decision is initially made to install a WLAN in a premises, the WLAN must first be engineered. In such engineering, the lay out of the premises, e.g., warehouse, office space, campus environment, etc. is first considered. In most installations, wireless coverage is desired across all areas of the premises. The deployment of the WAPs within the premises is the most critical step in the WLAN engineering. Because the conductance of Radio Frequency (RF) transmissions through building walls and other obstacles in the premises is dependent upon respective structure, the structural aspects of the premises must be carefully considered when determining WAP placement. However, most WAP placement decisions are subjectively made, based upon the care and experience level of the installer.

During the initial WLAN installation, the WAP placement is fixed. Thus, the WAP placement cannot address changes in the topology and structure of the premises. Such changes in the topology and structure may include the addition of walls, the additions of partitions, the addition of wiring that will affect propagation of RF transmissions, and other characteristics. Problems that typically result due to poor WAP placement include poor channel utilization, interference between WAPs, WAP capacity shortages, and other shortcomings. These operational problems, however, will typically only be seen as poor WLAN performance. The WLAN network installer/administrator, however, has no way of determining whether these problems are caused by equipment deficiencies, the nature of the premises, WAP placement, or lack of capacity in the WAPs.

Thus, there is a need in the art for improvements in the management of WAPs servicing a WLAN within a premises.

SUMMARY OF THE INVENTION

Thus to overcome the shortcomings of the prior devices among other shortcomings, a wireless local area network (WLAN) infrastructure constructed according to the present invention better services a plurality of wireless terminals through improved management and control of the WAPs and their characteristics. The WLAN infrastructure includes a wired backbone network, an air controller communicatively coupled to the wired backbone network, and a plurality of wireless access points (WAPs). The WAPs also communicatively couple to the wired backbone network. Each of the WAPs includes a processor, a wired backbone interface, a first radio, and a dynamically directional antenna coupled to the first radio. Each WAP also includes a second radio that couples to an antenna. The wired backbone interface communicatively couples to the processor and to the wired backbone network.

The first radio communicatively couples to the wired backbone interface and to the processor and supports communications with the plurality of wireless terminals. The directional antenna couples to the first radio and has an antenna gain pattern that is controlled by the processor. The second radio communicatively couples to the wired backbone interface and to the processor. The second radio passively listens to, but does not participate in the communications of at least some of the plurality of wireless terminals, gathers non-participatory WAP data, and provides the non-participatory WAP data to the processor. The processor receives the non-participatory WAP data from the second radio, creates WAP operational reports based there upon, and provides the WAP operational reports to the air controller. Based upon directions received from the air controller, the processor alters the gain pattern of the directional antenna.

According to another aspect of the present invention, the air controller may also provide directions to the WAP that causes the WAP to alter the transmission power of the first radio. According to still other aspect of the present invention, the air controller provides directions to the WAP that causes the WAP to alter the channels upon which the first radio operates. In altering the channels of operation of the first radio, the processor may direct the first radio to operate on a reserved set of channels that are available to the first radio. As is generally known, in a WLAN that operates according to particular operating protocol standard, e.g.; IEEE 802.11(b), a plurality of channels are allocated for operation within the WLAN.

According to the present invention, some channels may be reserved to service particular types of communications, e.g., Voice over Internet Protocol (VoIP) communications serviced by the WLAN, data communications required to meet a Quality of Service (QoS) requirement, etc. In such cases, a reserved set of channels is employed so that the WLAN will provide a service level that is sufficient to support the VoIP voice communication or QoS guaranteed data communication. Further, the reserved set of channels may service a virtual local area network within the WLAN service area.

In a particular operation according to the present invention, the air controller coordinates the operation of each of the plurality of WAPs of the WLAN. In coordinating the operation of the plurality of WAPs, the air controller controls the directional antennas of each of the plurality of WAPs. In another operation, the air controller coordinates the operation, e.g., transmit power and/or channelization, of the first radios of one or more of the plurality of WAPs. In other embodiments, the WAPs coordinate the operation of their own first radios based upon the non-participatory WAP data. Coordination of operation may include altering the transmit power of the first radios of each of the plurality of WAPs, altering channel usage, etc. By managing each of the plurality of WAPs, the air controller controls the service areas provided by each of the plurality of WAPs. Controlling the service area of the plurality of WAPs is particularly important in ensuring that wireless terminal load is distributed across the plurality of WAPs. Further, by controlling at least one of the gain pattern of the directional antennas of the plurality of WAPs and the transmit power of coupled first radios, the air controller reduces interference among the plurality of WAPs and increases WLAN performance.

The WAP operational reports may also include participatory WAP data, i.e., information regarding communications serviced by a respective WAP. The participatory WAP data may include received carrier signal strengths, carrier to interference ratios, byte error rates, dropped link occurrences, and channel utilization for communications with serviced wireless terminals. Each of these types of participatory WAP data indicates the relative quality of the communication link between the WAP and one or more serviced wireless terminals. The non-participatory WAP data, on the other hand, includes information relating to potentially all wireless terminals serviced by the WLAN. The non-participatory WAP data, however, can only characterize the information it receives and may include received carrier signal strengths, carrier interference ratios, and channel utilizations for the plurality transmissions it monitors. Because the second radio listens to wireless terminals that are not serviced by the first radio of the WAP collecting the non-participatory WAP data, the non-participatory WAP data is of great importance. Such is the case because transmissions received at a first WAP that are serviced by a second WAP produce interference at the first WAP. Thus, it is advantageous to at least one of control the gain of the directional antenna and transmission power of the first radio of the first WAP to reduce interference at the second WAP, and vice versa. In some operations, the non-participatory WAP data may include data based upon transmissions from other WAPs.

According to another embodiment of the present invention, each WAP only includes a single radio and a single antenna. In such case, the radio communicatively couples to the wired backbone interface and to the processor and supports communications with a first plurality of wireless terminals. The directional antenna couples to the first radio and has an antenna gain pattern that is controlled by the processor. When the radio is idle with respect to the first plurality of wireless terminals, the radio passively listens to, but does not participate in transmissions of at least some of a second plurality of wireless terminals, gathers non-participatory WAP data, and provides the non-participatory WAP data to the processor. The processor receives the non-participatory WAP data from the radio, creates WAP operational reports based there upon, and provides the WAP operational reports to the air controller. Then, based upon directions received from the air controller, the processor alters the gain pattern of the directional antenna.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1:
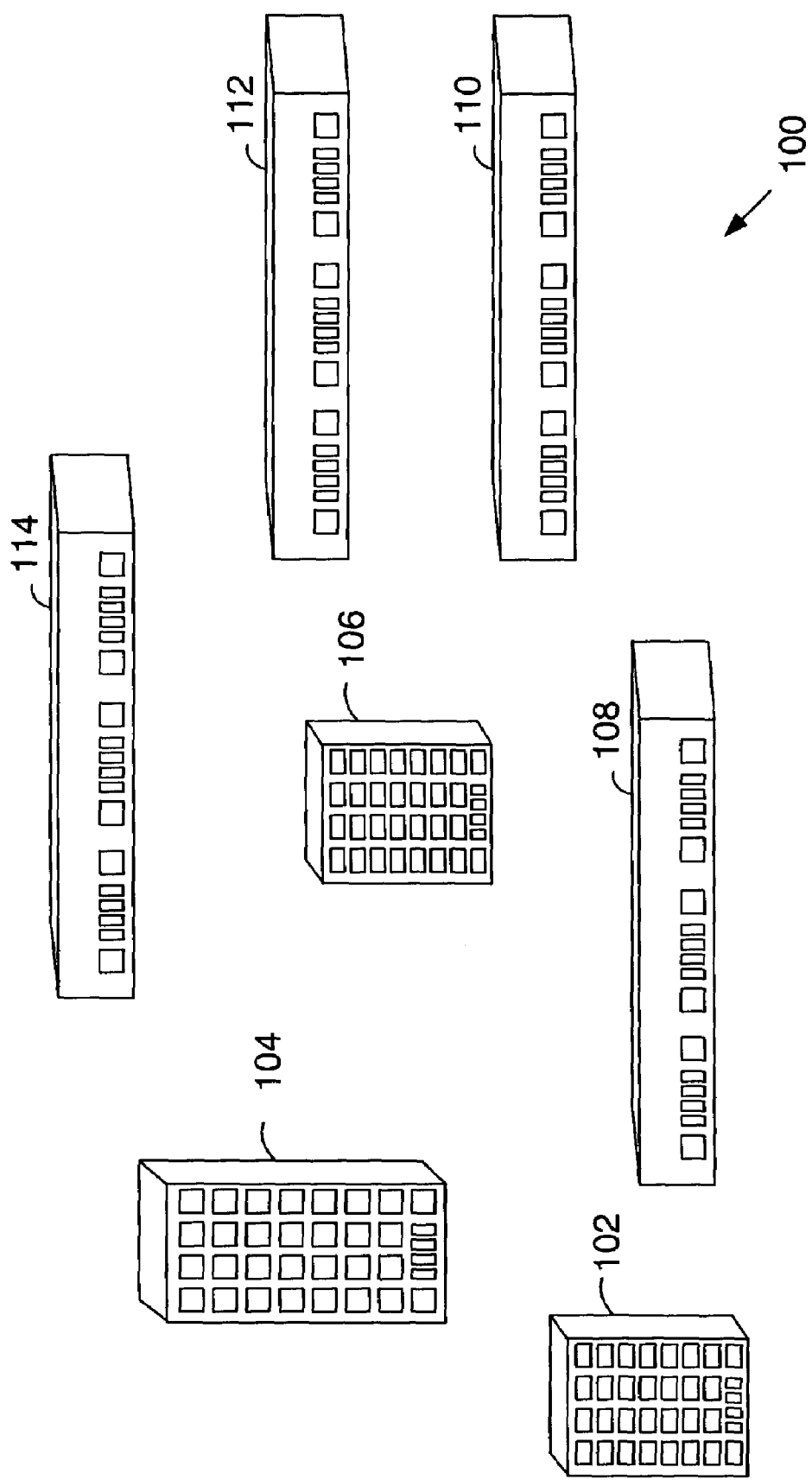
FIG. 1 is a system diagram illustrating a premises in which a Wireless Local Area Network (WLAN) constructed according to the present invention is deployed.

FIG. 1 is a system diagram illustrating a premises 100 in which a Wireless Local Area Network (WLAN) constructed according to the present invention is deployed. The premises 100 (campus) includes office buildings 102, 104, 106 and industrial buildings 108, 110, 112, and 114. The premises 100 may correspond to a company such as a technology company, a seller of goods, a service company, or another type of company. Contained within each of the office buildings 102, 104, and 106 are a number of offices, each of which provides a working space for at least one person. Each of the industrial buildings 108, 110, 112, and 114 provides space for manufacturing, storage, and/or another purpose. People also work within industrial buildings 108, 110, 112, and 114.

Contained within each of these buildings 102-114 are computer workstations, computer servers, printers, FAX machines, phones, and other electronic devices. Each of these electronic devices has its communication requirements. For example, computer workstations, computer servers, and printers each require data communication service. Such data communication service requires that the devices can communicate with other devices located within the premises 100 and with devices located external to the premises 100 across one or more data networks. The FAX machines and phones require coupling to one another and to the Public Switched Telephone Network (PSTN).

Figure 2:
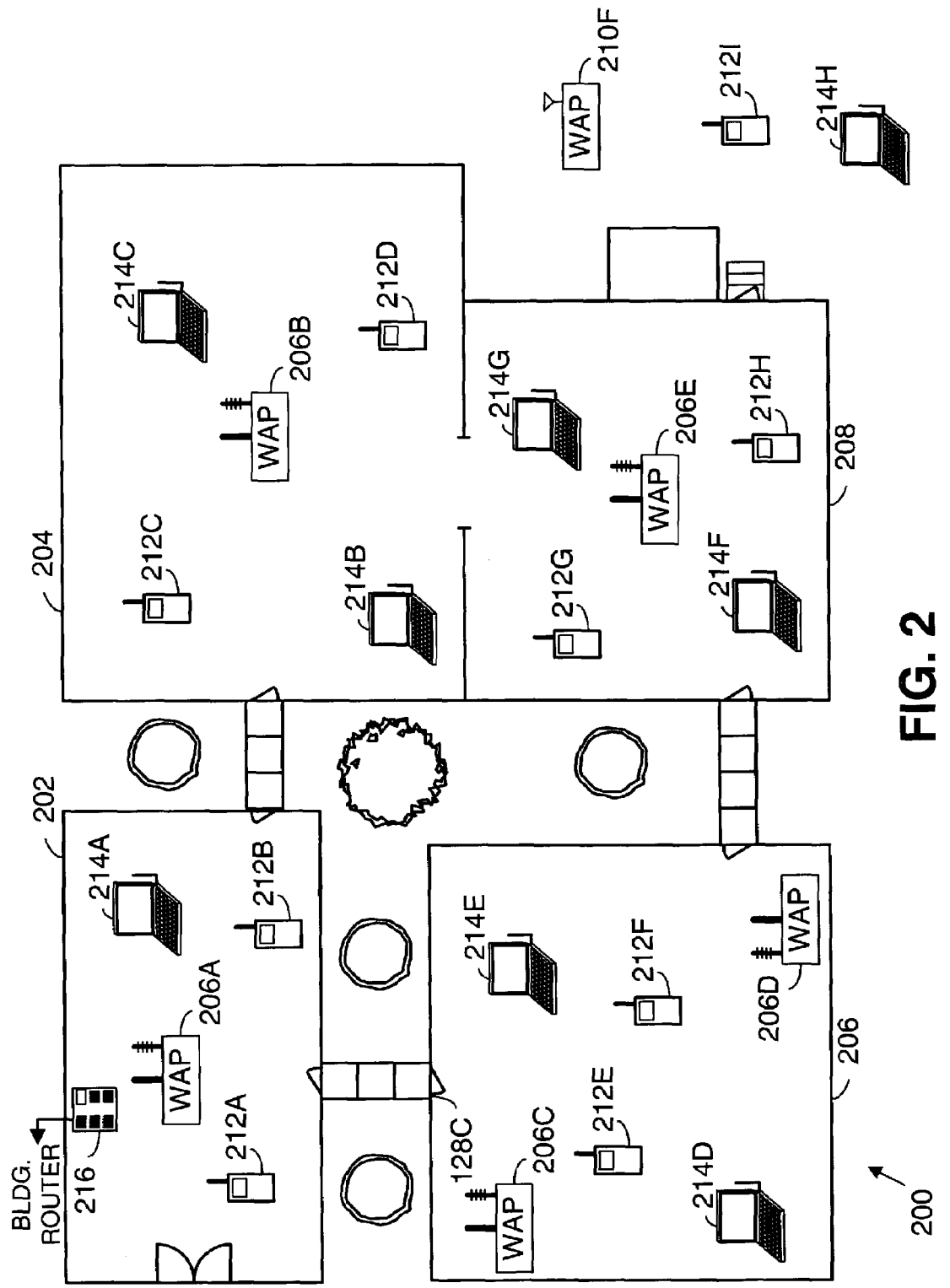
FIG. 2 is a partial system diagram illustrating a portion of the campus of FIG. 1 in which wireless communications are serviced according to the present invention.

FIG. 2 is a partial system diagram illustrating a portion of the campus of FIG. 1 in which wireless communications are serviced according to the present invention. A building floor 200 shown in FIG. 2 may be a lower floor of one of the buildings of FIG. 1, e.g., building 102. The building floor 200 includes a plurality of rooms 202, 204, 206, and 208. Each of these rooms 202, 204, 206, and 208 has placed therein WAPs 206A, 206B, 206C, 206D, and 206E, respectively, that service corresponding areas. Further, an external WAP 206F services an area external to room 208 of building floor 200. Each of these WAPs 206A-206F couples to a wired network infrastructure that may include a building router 216.

Serviced within the building floor 200 are wireless telephones/data terminals 212A-212I and laptop computers 214A-214H, together "wireless terminals." Each of these wireless terminals wirelessly communicates with a servicing WAP. For example, laptop computer 214A and wireless terminals 212A and 212B wirelessly communicate with WAP 206A (in their illustrated positions). Each of the WAPs 206A-206E supports wireless communications primarily within a designated area respectively. However, the coverage area of each WAP 206A-206E extends beyond the boundaries of the serviced rooms 202-208 so that overlapping coverage areas exist. For example, WAPs 206A and 206C provide service between rooms 202 and 206 so that wireless terminals that roam between the rooms continue to receive wireless communication service when between the rooms 202 and 206. Further, WAP 206E supports wireless communications outside of the floor 200 to service laptop computer 214H and wireless terminal 212I.

Figure 3:
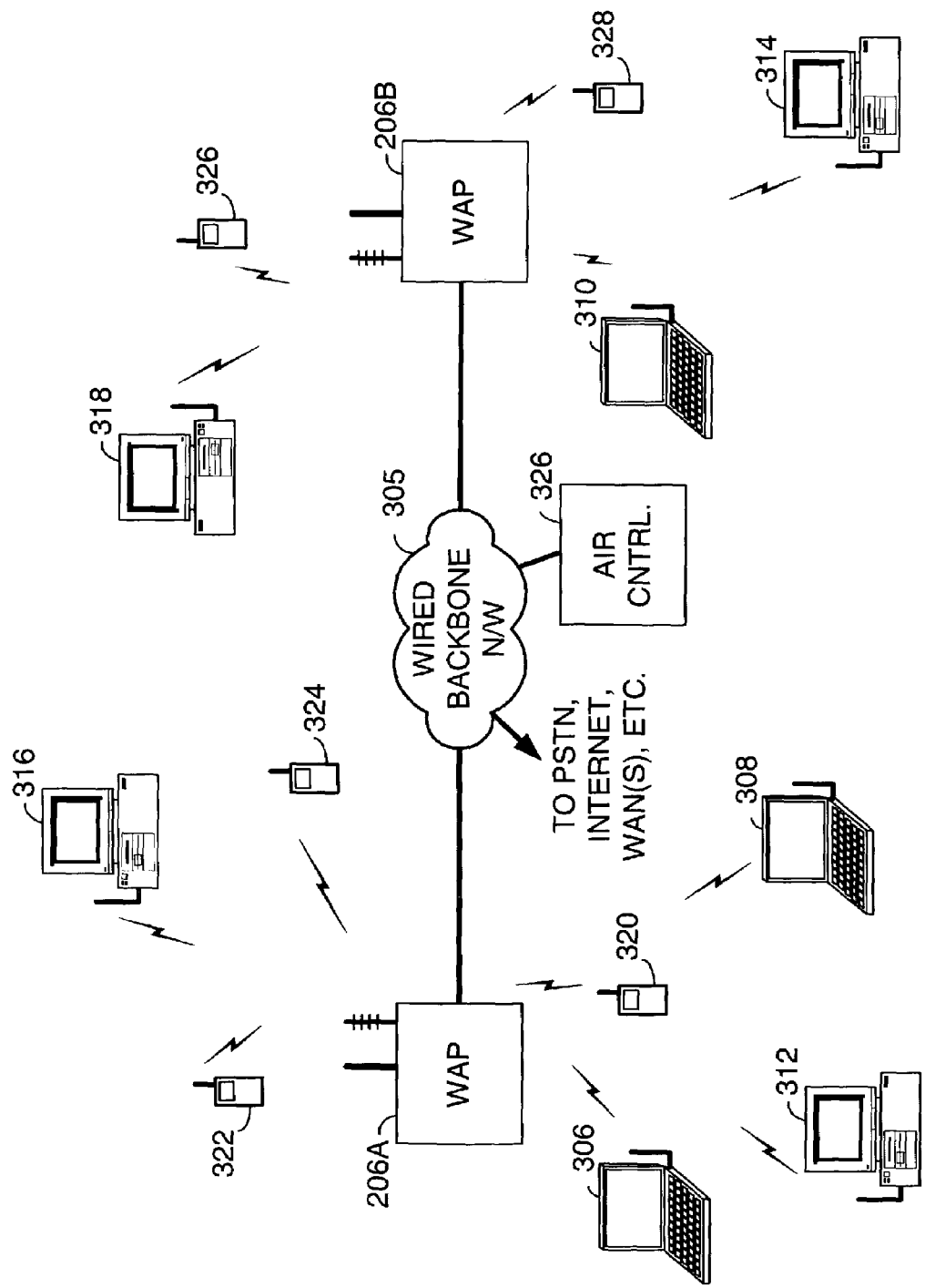
FIG. 3 is a partial system diagram illustrating a portion of a campus in which wireless communications are serviced according to the present invention.

FIG. 3 is a block diagram partially illustrating a portion of the WLAN of FIG. 2 that supports operations according to the present invention. The portion of the network shown includes WAPs 206A and 206B that support wireless communications within a serviced area, for example, the rooms 202 and 204 of FIG. 2. The WAPs 206A and 206B couple to a wired backbone network 305. The WAPs 206A and 206B service wireless communications for laptop computers 306, 308, and 310, desktop computers 312, 314, 316, and 318, and wireless telephones/data terminals 320, 322, 322, 324, 326, and 328, together "wireless terminals." Note that while different numbering is used for the wireless terminals of FIG. 3, they are the same as, or similar to wireless terminals of FIG. 2. Service coverage areas supported by WAPs 206A and 206B partially overlap. The wired backbone network 305 couples to one or more data networks and to an air controller 326.

As illustrated, each of the WAPs 206A and 206B includes two antennas. A first antenna of the two antennas is a dynamically directional antenna that couples to a first radio of a respective WAP and a second antenna of the two antennas couples to a second radio of a respective WAP. The directional antennas and first radios of the WAPs 206A and 206B service wireless communications with those of the laptop computers 306, 308, and 310, desktop computers 312, 314, 316, and 318, and wireless telephones/data terminals 320, 322, 322, 324, 326, and 328, together "wireless terminals," operating within respective service areas. As will be described further with reference to FIGS. 4-10, the WAPs 206A and 206B are controlled by the air controller 326 so that their respective service areas do not unduly interfere with one another and such that satisfactory service is provided therein. In such case, each of WAPs 206A and 206B provides service to a subset of the wireless terminals.

In controlling the WAPs 206A and 206B, the air controller 326 directs the WAPs 206A and 206B to alter the gain pattern of their directional antennas, to modify their first radio transmit powers, and to alter the channels upon which they operate, among other directions. The control of the WAPs 206A and 206B by the air controller 326 is based upon WAP operational reports received from the WAPs. Second radios of the WAPs 206A and 206B listen to transmissions from at least one of the wireless terminals and WAPs and collect non-participatory WAP data. The WAPs 206A and 206B produce the WAP operational reports based upon the non-participatory WAP data and forward the WAP operational reports to the air controller 326. In some operations, the WAP operational reports may also include information gathered by the WAPs 206A and 206B based upon the communications serviced by the first radio—participatory WAP data. Participatory WAP data may include received carrier signal strengths, carrier to interference ratios, bit error rates, dropped link occurrences, and channel utilization. Non-participatory WAP data may include received carrier signal strengths, carrier to interference ratios, and channel utilizations. Based upon the WAP operational reports, the air controller 326 controls the service areas of the plurality of WAPs 206A and 206B. Resultantly, the air controller 326 reduces Radio Frequency (RF) interference among the plurality of WAPs, ensures that coverage is provided within all desired areas of the premises, and provides specialized service when required, e.g., VoIP service.

According to another aspect of the present invention, that will be described further with reference to 7B and 7C, the WAPs 206A and 206B also control the directionality (and transmit power) of serviced wireless terminals. In performing this function, the WAPs 206A and 206B listen to the strength of the received transmissions from a managed wireless terminal, determine a gain vector for a directional antenna of the wireless terminal and have the wireless terminal control its directional antenna to meet this gain vector. Generally, the gain vector will correspond to the location of a servicing WAP, WAP 206A for example. By directing the gain of the directional antenna of the wireless terminal toward the servicing WAP 206A, interference with non-servicing WAPs is reduced and the ability of the servicing WAP 206A to service the wireless terminal is improved.

Figure 4:
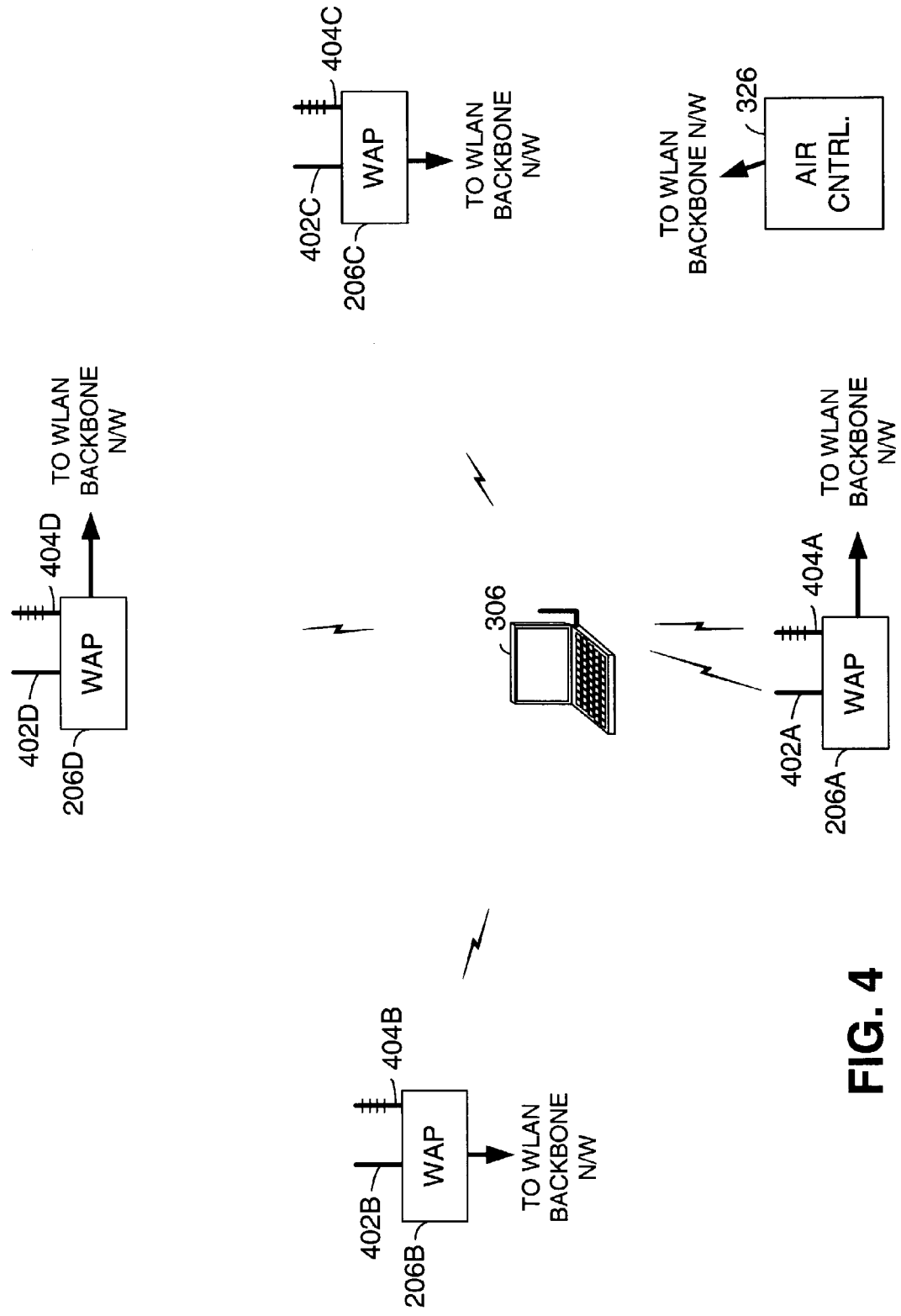
FIG. 4 is a partial system diagram illustrating a WLAN constructed according to the present invention.

FIG. 4 is a partial system diagram illustrating a WLAN constructed according to the present invention. As shown in FIG. 4, the WAPs 206A, 206B, 206C, and 206D are located across the serviced premises. Each of the WAPs 206A through 206D and the air controller 326 couples to the wired backbone network 305 (not in FIG. 4). As is further illustrated, each of the WAPs 206A through 206D includes a directional antenna 404A through 404D, respectively, and a second antenna, 402A through 402D, respectively.

WAP 206A services communications with a laptop computer 306 using its first radio and its directional antenna 404A. However, according to the present invention, each of the WAPs 206A, 206B, 206C, and 206D also listens to transmissions from the laptop computer 306 (and also to transmissions from the WAP 206A in some embodiments). In these operations, the WAPs 206A through 206D use antennas 402A through 402D and second radios, respectfully, to listen to transmissions of the laptop computer 306.

As will be further described herein with reference to FIGS. 5 through 10, in listening to transmissions of the laptop computer 306 and each other transmitting wireless terminal within the service premises and other sources of interference, the WAPs generate WAP operational reports. These WAP operational reports are forwarded by the WAPs 206A through 206D to the air controller 326. Based upon the WAP operational reports the air controller produces directions which are sent to one or more of the WAPs 206A through 206D. Then, based upon its directions, the WAPs 206A through 206D alter the operations of their directional antennas 404A-404D, respectively, alter the transmission power of their first radios, and/or alter the channels of operation of the first radios. According to another aspect of the present invention, when the WAPs 206A-206D include only a single radio and a single antenna, the WAPs 206A-260D listen to transmissions of non-serviced wireless terminals when they are idle with respect to their serviced wired terminals. Thus, with the embodiment, the WAPs 206A-206D are able to collect non-participatory WAP data and participatory WAP data using a single radio.

Figure 5:
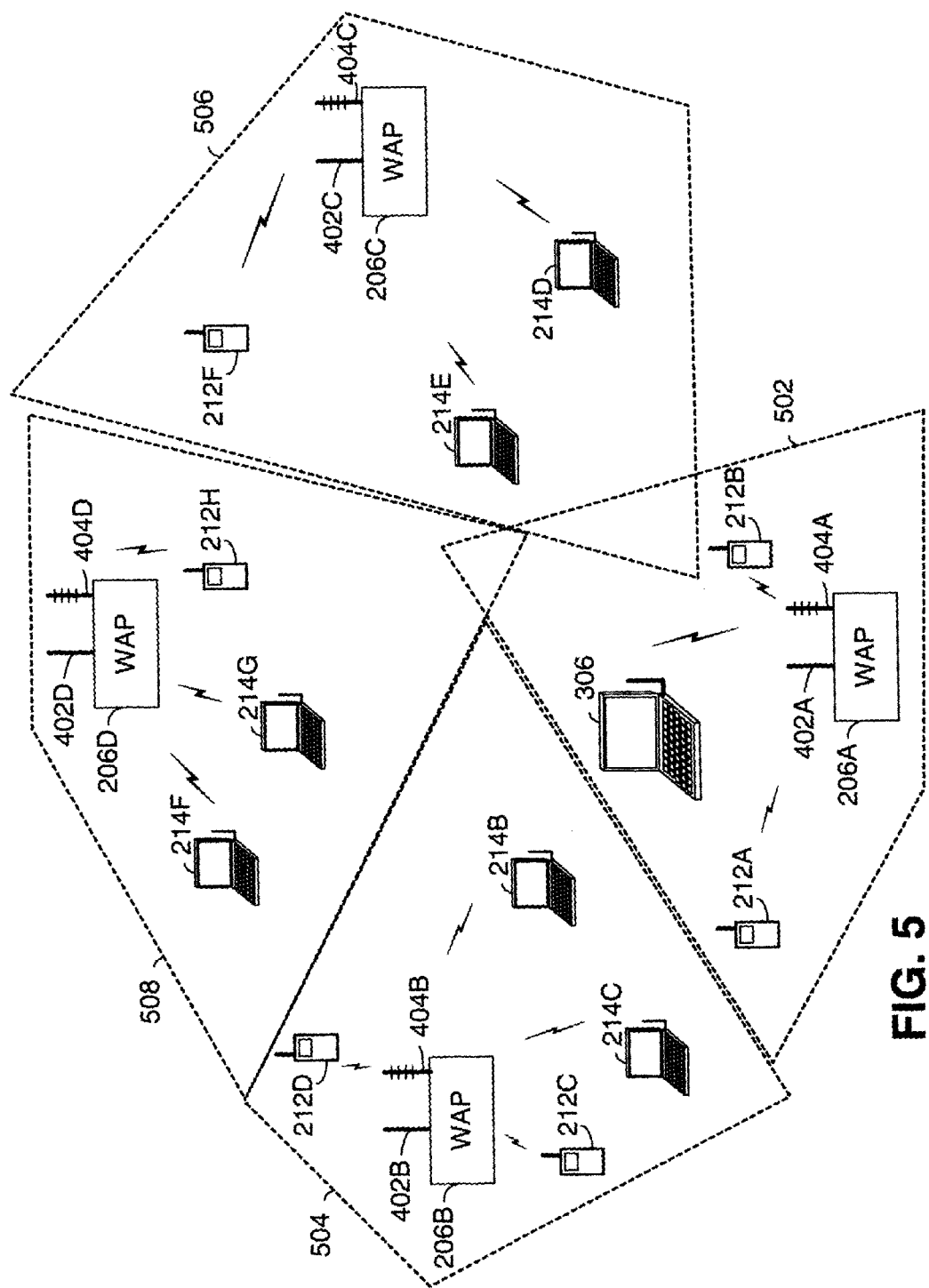
FIG. 5 is a partial system diagram illustrating in more detail the WLAN of FIG. 4.

FIG. 5 is a system diagram illustrating in more detail the WLAN of FIG. 4 that operates according to the present invention. FIG. 5 also illustrates the manner in which WAPs 206A through 206D service wireless terminals operating within the premises. As shown, WAP 206A provides RF coverage within a respective service area 502 for wireless terminals 212A, 212B, and 306. Likewise, WAP 206B provides RF coverage within a respective service area 504 for wireless terminals 212C, 212D, 214B and 214C. WAP 206C provides RF coverage within a respective service area 506 for wireless terminals 214D, 214E and 212F. Finally, WAP 206D provides RF coverage within a respective service area 508 for wireless terminals 212H, 214F, and 214G.

As is illustrated, each of the service areas 502, 504, 506, and 508 has an irregular shape. While these irregular shapes are exaggerated for the illustrative purposes of FIG. 5, each of the WAPs 206A through 206D includes directional antennas 404A through 404D, respectively, that are capable of supporting respective service areas having irregular (and unique) shapes. As was previously discussed herein, the directional antennas 404A through 404D, the transmit power provided thereto by the coupled first radios, and the channel usage of the first radios are altered via direction from the air controller. As part of this alteration process, varying the directionality of the directional antennas 404A through 404D as well as the transmit power applied to the directional antennas 404A through 404D will alter the service coverage areas 502, 504, 506, and 508 respectively. Such alteration in the service coverage areas 502 through 508 results in reduced interference among the WAPs 206A through 206D. In some operations, WAPs 206A through 206D have differing wireless terminal density within their service coverage areas 502-508. By altering these service coverage areas, the air controller equalizes load among the WAPs 206A through 206D. Further, by altering channel usage, varying the directionality of the directional antennas 404A through 404D, as well as the transmit power applied to the directional antennas 404A through 404D that are supported by the WAPs 206A through 206D, the air controller ensures that specialized service requirements, e.g. Quality of Service, VOIP service, are met.

Figure 6B:
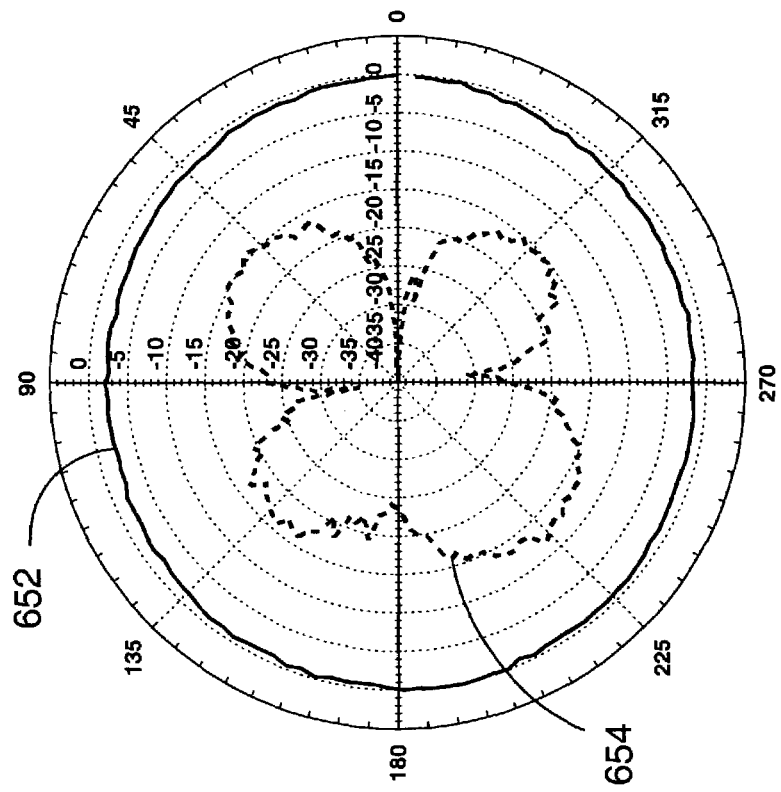
FIGS. 6A and 6B are graphs illustrating various antenna gain patterns of WAP directional antennas operating according to the present invention.
Figure 6A:
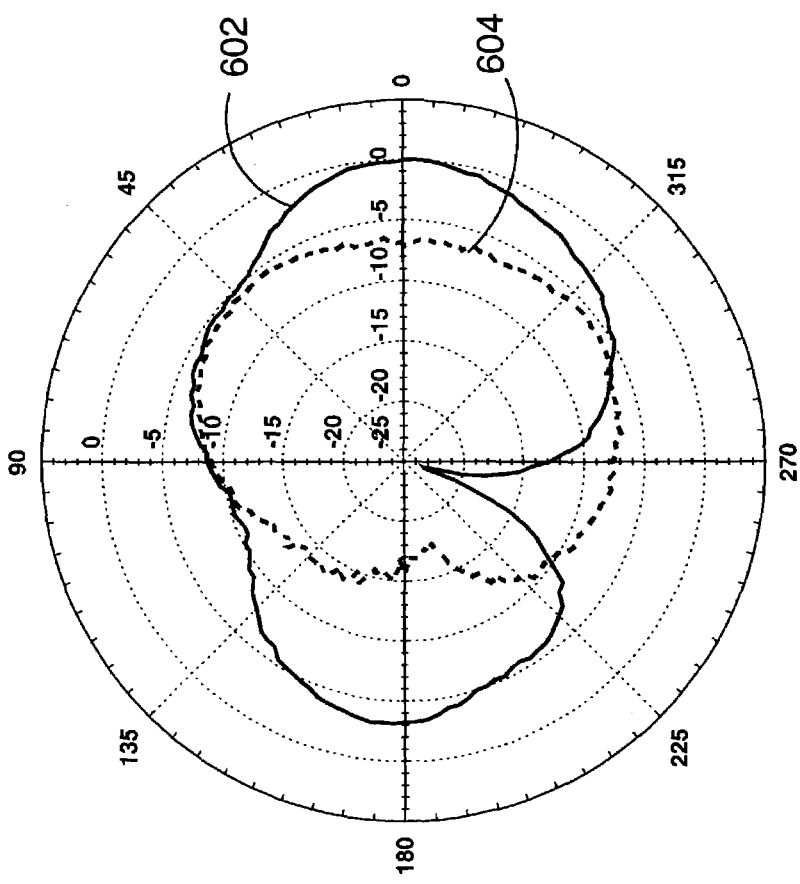

FIGS. 6A and 6B are graphs illustrating various antenna gain patterns of WAP directional antennas operating according to the present invention. As illustrated in FIG. 6A, a first antenna gain pattern 602 differs from a second antenna gain pattern 604. However, neither gain pattern of 602 or 604 is symmetrical about the antenna. The antenna gain patterns 602 and 604 may be those provided by the directional antennas 404A through 404D of one of the WAPs 206A through 206D.

As shown in FIG. 6B, a first antenna gain pattern 652 is substantially symmetrical. Such would be the case with a monopole or dipole antenna such as the antennas 402A through 402D of the WAPs 206A through 206B that couple to respective second radios. The second antenna gain pattern shown 654 may be a gain pattern that is produced by directional antenna 404A through 404D of the WAPs 206A through 206D.

Figure 7A:
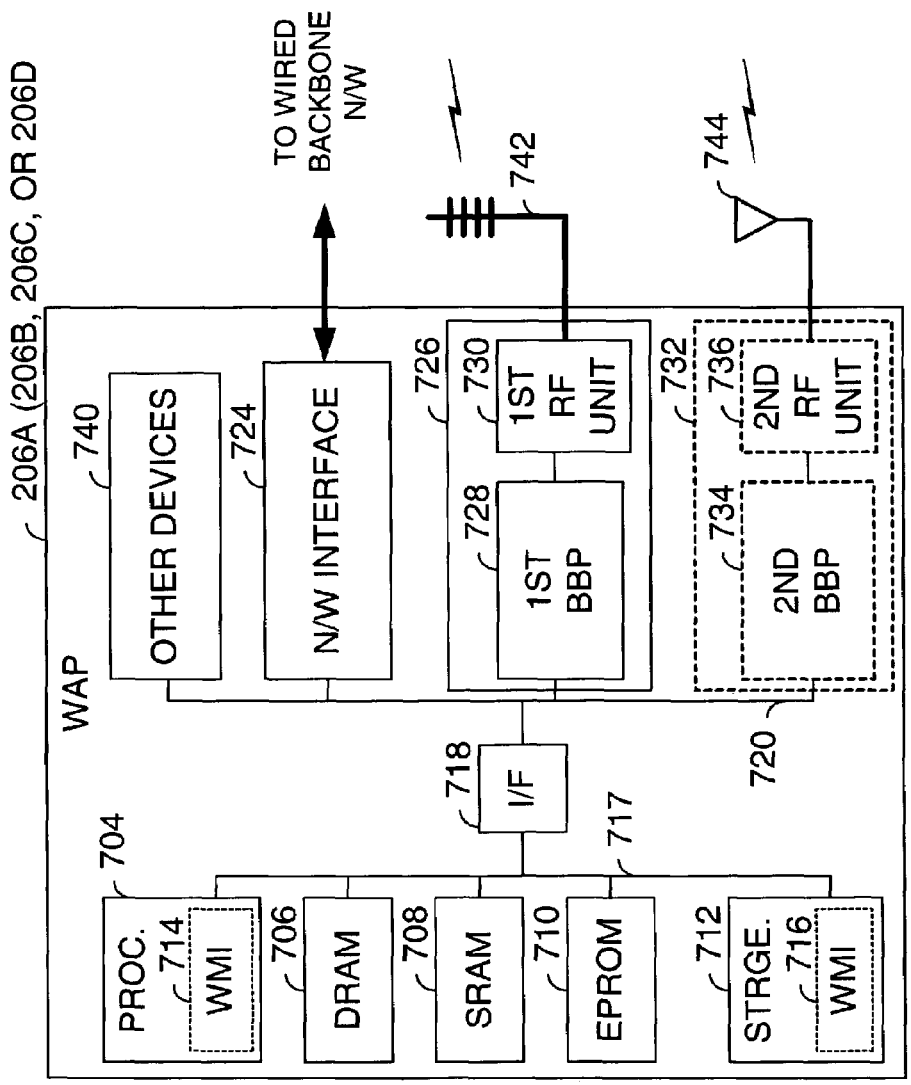
FIG. 7A is a block diagram illustrating a WAP constructed according to the present invention.

FIG. 7A is a block diagram illustrating a WAP 206A, 206B, 206C, or 206D constructed according to the present invention. The WAP 206A includes a processor 704 and one or more storage devices that may include dynamic RAM 706, static RAM 708, EPROM 710, and/or storage device 712, such as a hard drive, optical drive, tape drive, etc. These components intercouple via a local bus 717 and couple to a peripheral bus 720 via an interface 718. The processor 704 may be any type of processing device capable of executing software instructions. The processor 704 may be a single integrated circuit or a processing module including a plurality of integrated circuits.

The WAP 206A also includes a network interface 724, which couples the WAP 206A to the wired backbone network 305. The WAP 206A also includes a first radio 726, a second radio 732, directional antenna 742, and antenna 744. The first radio 726 includes a first baseband processor 728 and a first RF unit 730 that couples to the directional antenna 742. The second radio 732 includes a second baseband processor 734 and a second RF unit 736 that couples to antenna 744. The embodiment of the WAP 206A illustrated supports at least one standardized operating protocol, e.g., IEEE 802.11(a), IEEE 802.11(b), IEEE 802.11(g), etc.

In performing operations according to the present invention, the WAP 206A may execute software instructions, i.e., WAP Management Instructions (WMI). WMI 714 enable the WAP 206A to perform the operations of the present invention. In executing the WMI, the WMI 716 are loaded into the storage unit 712 and some or all of the WMI 714 are loaded into the processor 704 for execution. During this process, some of the WMI 716 may be loaded into the DRAM 706. In other embodiments, however, the WAP 206A may operate according to the present invention based upon hardware function, firmware instructions, or a combination of any/all of these.

Figure 7B:
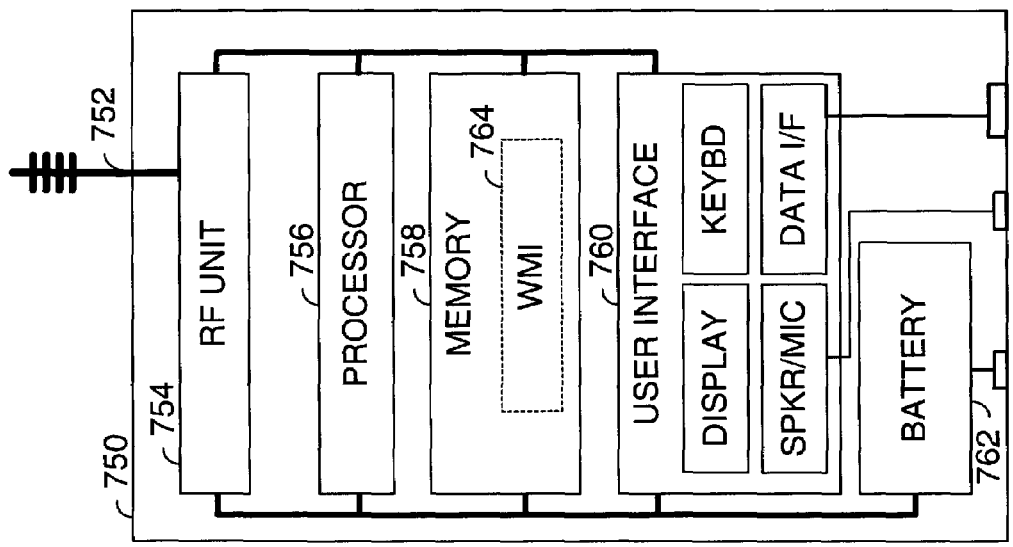
FIG. 7B is a block diagram illustrating the components of a wireless terminal that operates according to the present invention.

FIG. 7B is a block diagram illustrating the components of a wireless terminal that operates according to the present invention. The wireless terminal 750 includes a RF unit 754, a processor 756, and a memory 758. The RF unit 754 couples to a controllable directional antenna 752 that may be located internal or external to the case of the wireless terminal 750. In the described embodiment, the processor 756 controls the directionality of the directional antenna 752. In another embodiment, for enhanced directionality control, the wireless terminal 750 may include multiple antennas.

The processor 756 may be an Application Specific Integrated Circuit (ASIC) or another type of processor that is capable of operating the wireless terminal 750 according to the present invention. The memory 758 includes both static and dynamic components, e.g., DRAM, SRAM, ROM, EEPROM, etc. In some embodiments, the memory 758 may be partially or fully contained upon an ASIC that also includes the processor 756. A user interface 760 includes a display, indicators, a keyboard, a speaker, a microphone, and/or a data interface, and may include other user interface components. The radio 754, the processor 756, the memory 758, and the user interface 760 couple via one or more communication buses/links. A battery 762 also couples to and powers the radio 754, the processor 756, the memory 758, and the user interface 760. The structure of the wireless terminal 750 illustrated is only an example of one wireless terminal structure. Many other varied wireless terminal structures could be operated according to the teachings of the present invention.

As was previously discussed, according to another aspect of the present invention, the WAPs 206A and 206B may also control the directionality (and transmit power) of serviced wireless terminals. In performing this function, the WAPs 206A and 206B listen to the strength of the received transmissions from a managed wireless terminal, determine a gain vector for a directional antenna of the wireless terminal and have the wireless terminal control its directional antenna to meet this gain vector. Generally, the gain vector will correspond to the location of a servicing WAP, WAP 206A for example. By directing the gain of the directional antenna 752 of the wireless terminal 750 toward the servicing WAP 206A, interference with non-servicing WAPs is reduced and the ability of the servicing WAP 206A to service the wireless terminal is improved. The wireless terminal 750 of FIG. 7B supports these operations.

In performing the operations of the present invention, the wireless terminal 750 may execute software instructions, i.e., WAP Management Instructions (WMI) 764. WMI 764 enable the wireless terminal 750 to perform the operations of the present invention. In executing the WMI, the WMI 764 are loaded from memory 758 into the processor 756 for execution. In other embodiments, however, the wireless terminal 750 may operate according to the present invention based upon hardware function, firmware instructions, or a combination of any/all of these.

Figure 8:
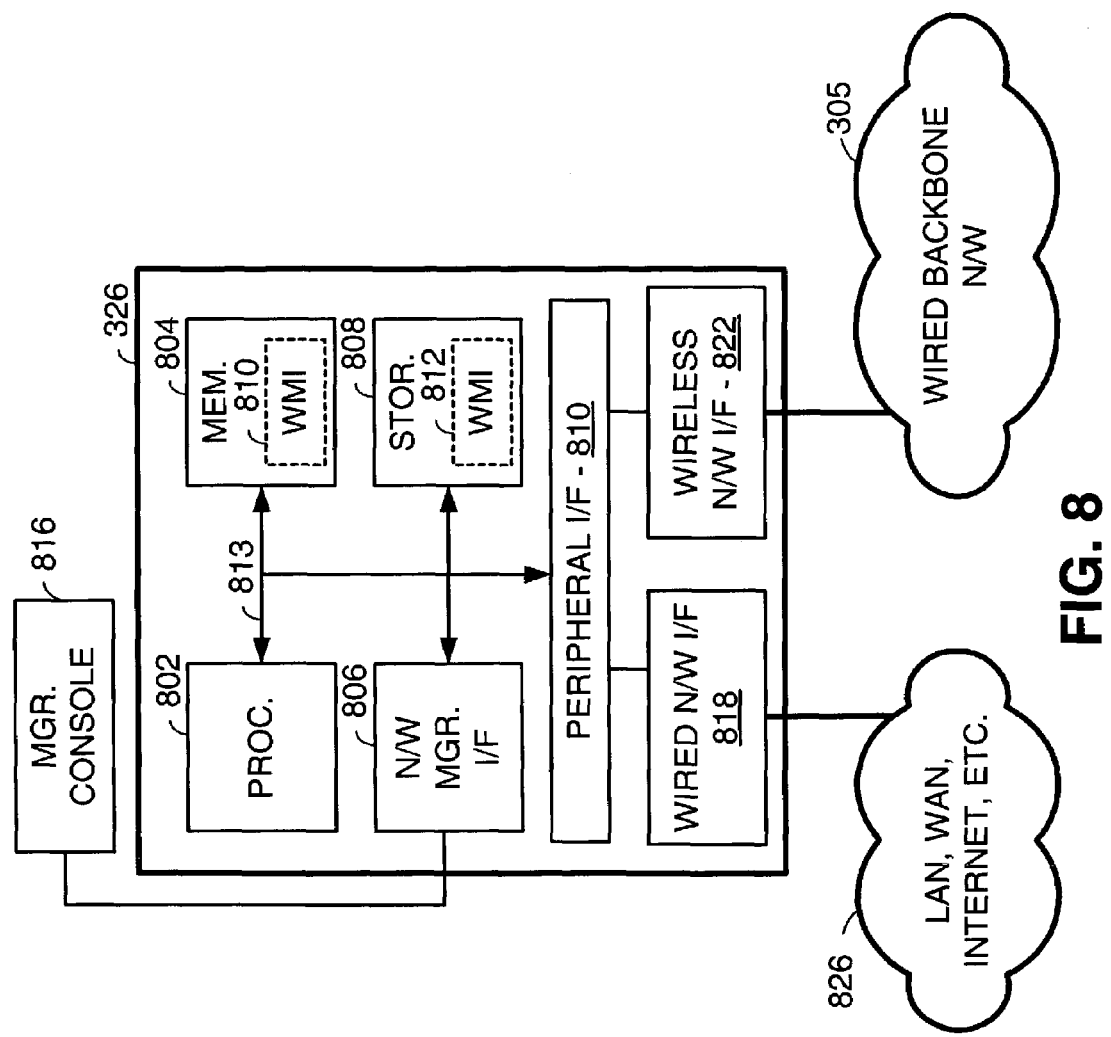
FIG. 8 is a block diagram illustrating an air controller constructed according to the present invention.

FIG. 8 is a block diagram illustrating an air controller 326 constructed according to the present invention. The air controller 326 may be general-purpose computer that has been programmed and/or otherwise modified to perform the particular operations described herein. The air controller 326 includes a processor 802, memory 804, a network manager interface 806, storage 808 and a peripheral interface 814, all of which couple via a processor bus 813. The processor 802 may be a microprocessor or another type of processor that executes software instructions to accomplish programmed functions. The memory 804 may include DRAM, SRAM, ROM, PROM, EPROM, EEPROM, or another type of memory in which digital information may be stored. The storage 808 may be magnetic disk storage, magnetic tape storage, optical storage, or any other type of device, which is capable of storing digital instructions and data.

The network manager interface 806 couples to a network manager console 816, which allows a network manager to interface with the air controller 326. The network manager console 816 may be a keypad/display or may be a more complex device, such as a personal computer, which allows the manager to interface with the air controller 326. However, the network manager may interface with the air controller 326 using other techniques as well, e.g., via a card coupled to the peripheral interface 810.

The peripheral interface 810 couples to a wired network interface 818 and to wireless network infrastructure interface 822. The wired network interface 818 couples the air controller 326 to at least one network 826 that may include a Local Area Network (LAN), a Wide Area Network (WAN), or the Internet. The wireless network infrastructure interface 822 couples the air controller 326 to the wired backbone network 305.

WAP Management Instructions (WMI) 812 are loaded into the storage 808 of the air controller 326. Upon their execution, a portion of the WMI 812 is downloaded into memory 804 (as WMI 810). The processor 802 then executes the WMI 810 to perform the operations described herein performed by the air controller 326. The programming and operation of digital computers is generally known to perform such steps. Thus, the manner in which the processor 802 and the other components of the air controller 326 function to perform these operations is not further described herein.

Figure 9A:
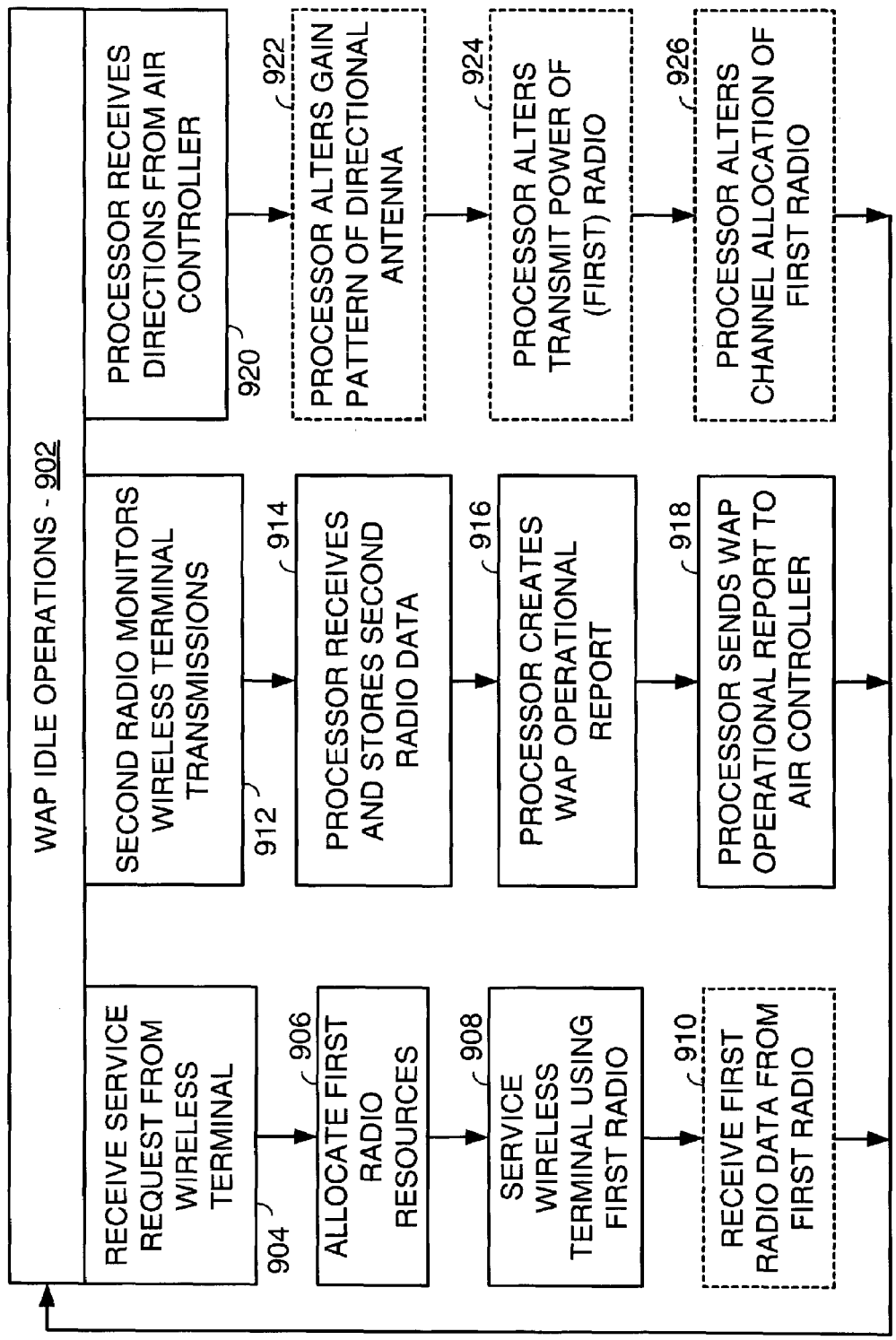
FIGS. 9A and 9B are a logic diagrams illustrating WAP operations according to the present invention.
Figure 9B:
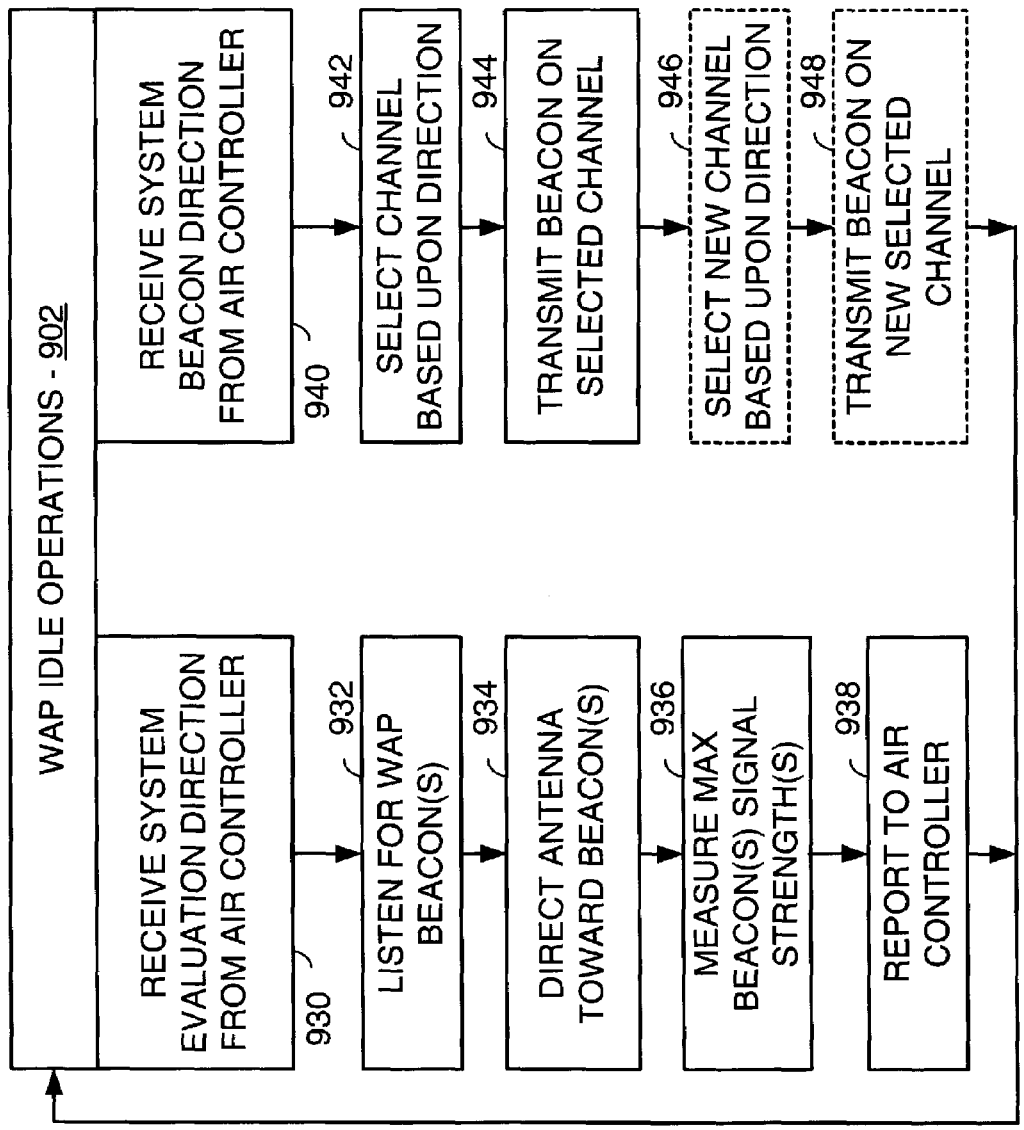

FIGS. 9A and 9B are a logic diagrams illustrating WAP operations according to the present invention. Referring particularly to FIG. 9A, operation of the WAP remains idle state until action according to the present invention commences (step 902). From step 902, the WAP may receive a service request from a wireless terminal (step 904), may employ its second radio to monitor wireless terminal transmission (step 912), may receive directions from an air controller (step 920), may receive a system evaluation direction from the air controller (step 930), or may receive a system beacon direction from the air controller (step 940).

The WAP may receive a service request from any wireless terminal operating in the WAP's service area (step 904). From step 904, the WAP allocates first radio resources for servicing the wireless terminal (step 906). The manner in which a wireless terminal requests service from the WAP and the manner in which the WAP responds may be defined according to a standardized operating protocol, e.g. IEEE 802.11(a), IEEE 802.11(b), or IEEE 802.11(g). After first radio resources are allocated, the WAP services the wireless terminal using its first radio (step 908). In servicing the wireless terminal, the WAP may optionally receive participatory WAP data from the first radio 910. Once the communication has been fully serviced, operation returns from 910 to step 902.

From step 912 in which the second radio monitors wireless terminal and/or WAP transmissions, the processor of the WAP receives and stores the non-participatory WAP data (step 914). As has been previously described, the second radio of the WAP is listens to wireless terminal and/or WAP transmissions within the WLAN. In this fashion, the second radio is able to determine when a conflict or sub optimal operating condition exists. In performing this type of listening, the second radio gathers non-participatory WAP data. Optionally, the first radio gathers participatory WAP data that relates to its serviced communications.

In another embodiment of the present invention, each WAP only includes a single radio. In this embodiment, the single radio collects participatory WAP data when it is actively servicing a wireless terminal and collects non-participatory WAP data when it is not actively servicing a wireless terminal but is instead merely listening. In either embodiment, the first radio and/or the second radio provide the non-participatory data (and optionally the participatory WAP data) to the processor.

After receipt of the non-participatory WAP data and optionally the participatory WAP data, the WAP creates a WAP operational report (step 916). In particular, the processor of the WAP creates the WAP operational report. The processor then sends the WAP operational report to the air controller (step 918). The WAP may send the WAP operational report to the air controller periodically or immediately after its creation, or upon request by the air controller. As is evidenced, the WAP operational report may not be created on a periodic fashion because of variations in loading on the WLAN. During high usage times, e.g., during the day, more participatory WAP data and non-participatory WAP data is collected than during low usage times, e.g., night time hours. Thus, the WAP operational reports may be sent from the WAP to the air controller as is required considering particular system loading conditions.

When the processor of the WAP receives directions from the air controller (at step 920), the processor performs at least one of three different operations. In a first one of these operations, the processor alters the gain pattern of the directional antenna of the corresponding WAP (step 922). In a second operation, the processor alters the transmit power of the first radio of the WAP (step 924). In a third operation, the processor alters the channel allocation of the first radio (step 926). From each of step 918 and 926, operation returns to step 902.

Referring now to FIG. 9B, operations regarding WLAN system evaluation are discussed. Generally, immediately after installation, or at a subsequent time, the WLAN is evaluated for its coverage and performance. As one step of this evaluation, the relative radio positions of the WAPs of the WLAN are determined. One technique for this determination is accomplished at step 930-948. As a first operation in this evaluation, a WAP receives a system evaluation direction from the air controller (step 930). In response to the system evaluation direction, the WAP listens for beacons of other WAPs (step 932). These beacons will typically be on particular channels at particular times. When the WAP hears a beacon, it controls its directional antenna in the direction of the beacon (step 934). Then, the WAP measures the maximum signal strength of the beacon (step 936). Steps 932, 934, and 936 will be repeated for each beacon. The air controller, in the system evaluation direction, may identify the beacon channels and beacon intervals to the WAPs. Alternately, the WAP will simply scan for beacons on each serviced channel, record information, and continue until directed to stop by the air controller. Finally, the WAP prepares a report regarding the beacon and provides the report to the air controller (step 938).

At step 940, the WAP receives a system beacon direction from the air controller (step 940). In response to the system beacon direction, the WAP selects a channel (step 942) and transmits a beacon on the selected channel (step 944). In one operation, the WAP transmits in a non-directional manner. However, in another operation, the WAP transmits with a previously determined directionality. With step 944 complete, the WAP optionally selects a new channel based upon the received direction or based upon another received direction (step 946) and transmits a beacon on the new selected channel (step 948). From steps 938 and 948 operation returns to step 902.

Figure 10:
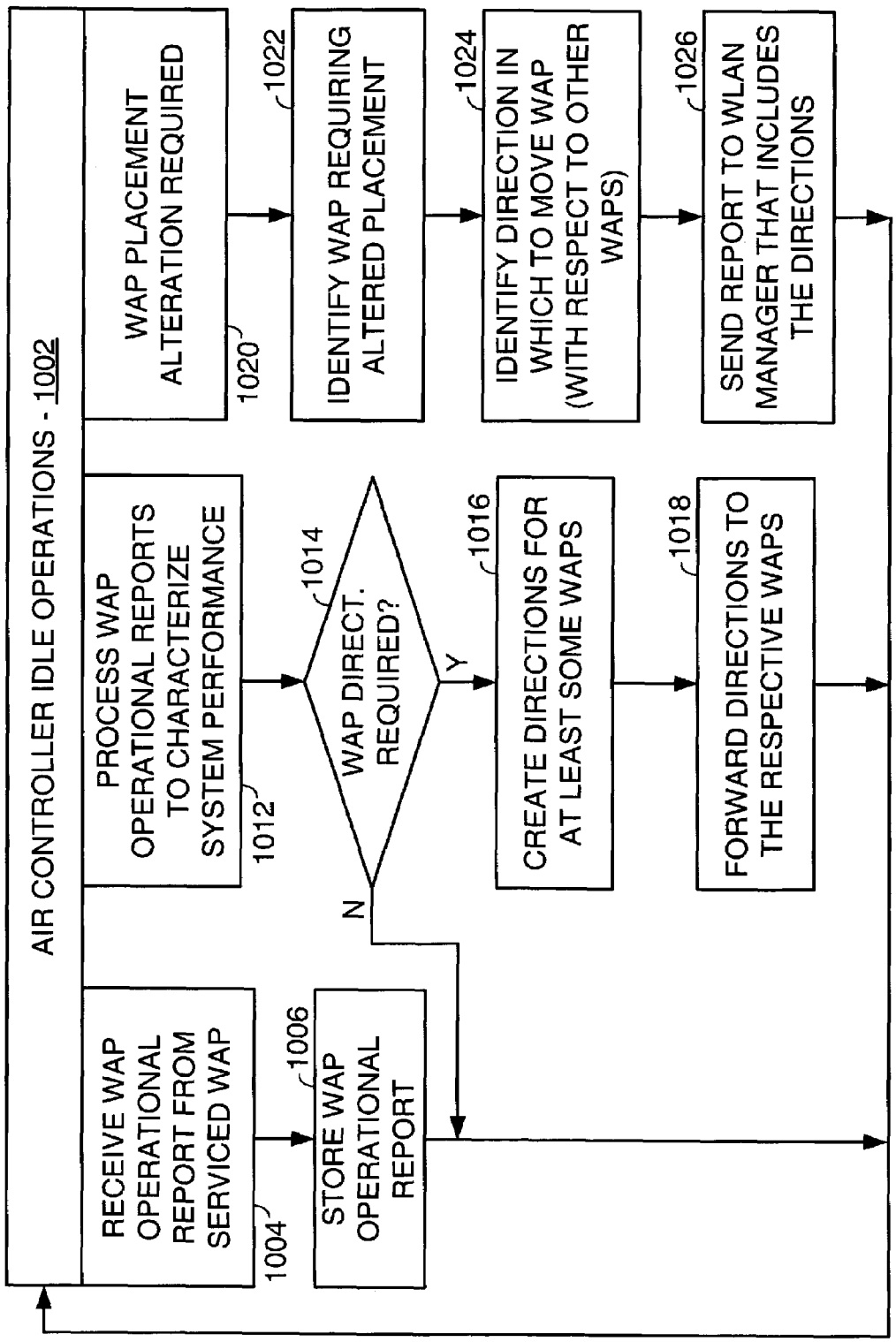
FIG. 10 is a logic diagram illustrating air controller operations according to the present invention.

FIG. 10 is a logic diagram illustrating air controller operations according to the present invention. When the air controller is not performing operations of the present invention, it is either idle or performing other of its operations (step 1002).

During a first operation of the present invention, the air controller receives a WAP operational report from a serviced WAP (step 1004). The air controller then stores the WAP operation report in its memory (step 1006). From step 1006 operation returns to step 1002.

In a second operation from step 1002, the air controller processes the received WAP operational reports to characterize system performance of the WLAN (step 1012). Based upon this system performance characterization, the WAP determines whether WAP directions are required (step 1014). If WAP directions are not required, operation proceeds from step 1014 to step 1002. However, if WAP directions are required, the air controller creates directions for at least some of the WAPs of the serviced WLAN (step 1016). Then, the air controller forwards the directions to respective WAPs (step 1018). Because the directions may only alter operation of one of the WAPs, at step 1018, the directions are forwarded to only targeted WAPs of the plurality of WAPs of the WLAN. However, in other operations, the directions are forwarded to a number of respective WAPs that are requested to alter their operations. In still another operation, the directions are broadcast to all managed WAPs. From step 1018 operations returns to step 1002.

According to a further operation, the air controller may determine that it can no longer simply adjust operations of the WAPs but that WAP placement alterations are required (step 1020). In such case, the air controller identifies the WAP(s) requiring altered placement (step 1022). Such determination may be made by the air controller based upon its continued attempted adjustment of the WAP without producing sufficient WLAN system performance improvement. In its operations, the air controller may also identify a direction in which to move a WAP with respect to other WAPs (step 1024). The air controller then sends a report to a WLAN manager that includes directions for WAP movement (step 1026). From step 1026 operation returns to step 1002.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A Wireless Local Area Network (WLAN) infrastructure that services a plurality of wireless terminals, the WLAN infrastructure comprising:
   a wired backbone network;
   an air controller communicatively coupled to the wired backbone network;
   a plurality of Wireless Access Points (WAPs) communicatively coupled to the wired backbone network, wherein each of the plurality of WAPs comprises:
      a processor;
      a wired backbone interface communicatively coupled to the processor;
      a first radio communicatively coupled to the wired backbone interface and to the processor that supports communications with the plurality of wireless terminals;
      a directional antenna coupled to the first radio having an antenna gain pattern that is controlled by the processor;
      a second radio communicatively coupled to the wired backbone interface and to the processor that listens to, but does not participate in transmissions of at least some of the plurality of wireless terminals, gathers non-participatory WAP data, and provides the non-participatory WAP data to the processor;

an antenna coupled to the second radio;

wherein, the processor receives the non-participatory WAP data from the second radio, creates WAP operational reports based there upon, and provides the WAP operational reports to the air controller; and wherein, based upon directions received from the air controller, the processor alters the gain pattern of the directional antenna.

2. The WLAN infrastructure of claim 1, wherein based upon directions received from the air controller, the processor also alters the transmission power of the first radio.

3. The WLAN infrastructure of claim 1, wherein based upon directions received from the air controller, the processor also alters the channels of operation of the first radio.

4. The WLAN infrastructure of claim 3, wherein in altering the channels of operation of the first radio, the processor directs the first radio to operate on a reserved set of channels.

5. The WLAN infrastructure of claim 4, wherein the first radio supports communications with a WLAN telephone on the reserved set of channels.

6. The WLAN infrastructure of claim 3, wherein in altering the channels of operation of the first radio, the processor directs the first radio to operate on one of a plurality of sets of available channels.

7. The WLAN infrastructure of claim 1, wherein the air controller coordinates the operation of directional antennas of each of the plurality of WAPs.

8. The WLAN infrastructure of claim 7, wherein the air controller also coordinates the operation of first radios of each of the plurality of WAPs.

9. The WLAN infrastructure of claim 8, wherein in controlling the directional antennas and the first radios of each of the plurality of WAPs, the air controller controls the service areas of the plurality of WAPs.

10. The WLAN infrastructure of claim 8, wherein in controlling the directional antennas and the first radios of each of the plurality of WAPs, the air controller reduces inter-WAP interference among the plurality of WAPs.

11. The WLAN infrastructure of claim 1, wherein the WAP operational reports further include participatory WAP data received by the processor from the first radio.

12. The WLAN infrastructure of claim 11, wherein participatory WAP data is selected from the group consisting of received carrier signal strength, carrier to interference ratio, bit error rate, dropped link occurrences, and channel utilization.

13. The WLAN infrastructure of claim 1, wherein the non-participatory WAP data provided by the second radio is selected from the group consisting of received carrier signal strength, carrier to interference ratio, and channel utilizations.

14. A Wireless Local Area Network (WLAN) infrastructure that services a plurality of wireless terminals, the WLAN infrastructure comprising:

a wired backbone network;

an air controller communicatively coupled to the wired backbone network;

a plurality of Wireless Access Points (WAPs) communicatively coupled to the wired backbone network, wherein each of the plurality of WAPs comprises:

a processor;

a wired backbone interface communicatively coupled to the processor;

a radio communicatively coupled to the wired backbone interface and to the processor that supports communications with a first plurality of wireless terminals;

a directional antenna coupled to the first radio having an antenna gain pattern that is controlled by the processor;

wherein when the radio is idle with respect to the first plurality of wireless terminals, the radio listens to, but does not participate in transmissions of at least some of a second plurality of wireless terminals, gathers non-participatory WAP data, and provides the non-participatory WAP data to the processor;

wherein, the processor receives the non-participatory WAP data from the radio, creates WAP operational reports based there upon, and provides the WAP operational reports to the air controller; and wherein, based upon directions received from the air controller, the processor alters the gain pattern of the directional antenna.

15. The WLAN infrastructure of claim 14, wherein based upon directions received from the air controller, the processor also alters the transmission power of the radio.

16. The WLAN infrastructure of claim 14, wherein based upon directions received from the air controller, the processor also alters the channels of operation of the radio.

17. The WLAN infrastructure of claim 16, wherein in altering the channels of operation of the radio, the processor directs the radio to operate on a reserved set of channels.

18. The WLAN infrastructure of claim 17, wherein the radio supports communications with a WLAN telephone on the reserved set of channels.

19. The WLAN infrastructure of claim 17, wherein in altering the channels of operation of the radio, the processor directs the radio to operate on one of a plurality of sets of available channels.

20. The WLAN infrastructure of claim 14, wherein the air controller coordinates the operation of directional antennas of each of the plurality of WAPs.

21. The WLAN infrastructure of claim 20, wherein the air controller also coordinates the operation of radios of each of the plurality of WAPs.

22. The WLAN infrastructure of claim 21, wherein in controlling the directional antennas and the radios of each of the plurality of WAPs, the air controller controls the service areas of the plurality of WAPs.

23. The WLAN infrastructure of claim 21 wherein in controlling the directional antennas and the radios of each of the plurality of WAPs, the air controller reduces inter-WAP interference among the plurality of WAPs.

24. The WLAN infrastructure of claim 14 wherein the WAP operational reports further include participatory WAP data received by the processor from the radio.

25. The WLAN infrastructure of claim 24, wherein participatory WAP data is selected from the group consisting of received carrier signal strength, carrier to interference ratio, bit error rate, dropped link occurrences, and channel utilization.

26. The WLAN infrastructure of claim 14, wherein the non-participatory WAP data is selected from the group consisting of received carrier signal strength, carrier to interference ratio, and channel utilizations.

27. A method for operating a Wireless Access Point (WAP) of a Wireless Local Area Network (WLAN), the method comprising:

servicing communications with at least one wireless terminal using a first radio and a directional antenna;

listening to communications between at least one other wireless terminal and another WAP of the WLAN;

based upon the listening to the communications between the at least one other wireless terminal and the another WAP of the WLAN, collecting non-participatory WAP data;

creating a WAP operational report based upon the non-participatory WAP data;

providing the WAP operational report to an air controller;

receiving directions from the air controller; and based upon the directions received from the air controller, altering the gain pattern of the directional antenna.

28. The method of claim 27, further comprising altering the transmission power of the first radio based upon the directions received from the air controller.

29. The method of claim 27, further comprising altering the channels of operation of the first radio based upon the directions received from the air controller.

30. The method of claim 29, wherein altering the channels of operation of the first radio includes operating on a reserved set of channels.

31. The method of claim 30, further comprising communicating with a WLAN telephone on the reserved set of channels.

32. The method of claim 29, wherein altering the channels of operation of the first radio based upon the directions received from the air controller includes operating on one of a plurality of sets of available channels.

33. The method of claim 27, further comprising coordinating the operation of directional antennas of each of a plurality of WAPs of the WLAN.

34. The method of claim 33, further comprising coordinating the operation of first radios of each of a plurality of WAPs of the WLAN.

35. The method of claim 34, wherein in coordinating the operation of the directional antennas and the first radios of the plurality of WAPs of the WLAN, the air controller controls the service areas of the plurality of WAPs of the WLAN.

36. The method of claim 34, wherein in coordinating the operation of the directional antennas and the first radios of the plurality of WAPs of the WLAN, the air controller reduces inter-WAP interference among the plurality of WAPs of the WLAN.

37. The method of claim 27, further comprising:

based upon servicing communications with at least one wireless terminal using a first radio and a directional antenna, collecting participatory WAP data; and wherein the WAP operational report is also based upon the participatory WAP data.

38. The method of claim 37, wherein the participatory WAP data is selected from the group consisting of received carrier signal strength, carrier to interference ratio, bit error rate, dropped link occurrences, and channel utilization.

39. The method of claim 27, wherein the non-participatory WAP data is selected from the group consisting of received carrier signal strength, carrier to interference ratio, and channel utilizations.

40. The method of claim 27, wherein a second radio listens to communications between the at least one other wireless terminal and the another WAP of the WLAN.

41. The method of claim 27, wherein the first radio listens to communications between the at least one other wireless terminal and the another WAP of the WLAN when not communicating with a wireless terminal.

* * * * *